(12) United States Patent
Grobman

(10) Patent No.: US 7,669,229 B2
(45) Date of Patent: Feb. 23, 2010

(54) NETWORK PROTECTING AUTHENTICATION PROXY

(75) Inventor: Steven L. Grobman, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1078 days.

(21) Appl. No.: 10/294,126

(22) Filed: Nov. 13, 2002

(65) Prior Publication Data

US 2004/0093519 A1 May 13, 2004

(51) Int. Cl.
*H04L 9/32* (2006.01)

(52) U.S. Cl. .................. 726/2; 726/1; 726/3; 726/6; 726/12; 726/14; 726/25; 726/27; 709/225; 709/227; 709/229

(58) Field of Classification Search .......... 713/200, 713/169, 165, 187, 155, 168; 726/2, 3, 11, 726/12, 23, 27, 4, 25, 26, 30, 28, 1, 14; 709/225, 709/227, 224, 229
See application file for complete search history.

(56) References Cited

U.S. PATENT DOCUMENTS

| | | | | |
|---|---|---|---|---|
| 5,495,235 A * | 2/1996 | Durinovic-Johri et al. | . | 340/5.27 |
| 6,263,447 B1 * | 7/2001 | French et al. | .................. | 726/5 |
| 6,529,955 B1 * | 3/2003 | Sitaraman et al. | ........... | 709/225 |
| 6,618,806 B1 * | 9/2003 | Brown et al. | ................ | 713/186 |
| 6,640,302 B1 * | 10/2003 | Subramaniam et al. | ...... | 713/169 |
| 6,662,228 B1 * | 12/2003 | Limsico | ....................... | 709/225 |
| 6,668,322 B1 * | 12/2003 | Wood et al. | .................. | 713/182 |
| 6,732,105 B1 * | 5/2004 | Watson, Jr. et al. | ........... | 707/10 |
| 6,816,901 B1 * | 11/2004 | Sitaraman et al. | ........... | 709/225 |
| 6,986,038 B1 * | 1/2006 | Leah et al. | ................... | 713/155 |
| 6,988,208 B2 * | 1/2006 | Hrabik et al. | ................. | 726/23 |
| 7,020,705 B2 * | 3/2006 | Wang et al. | .................. | 709/229 |
| 7,032,026 B1 * | 4/2006 | Biswas et al. | ............... | 709/229 |
| 7,159,120 B2 * | 1/2007 | Muratov et al. | ............. | 713/182 |
| 7,389,354 B1 * | 6/2008 | Sitaraman et al. | ........... | 709/229 |
| 2003/0115344 A1 * | 6/2003 | Tang et al. | .................. | 709/229 |
| 2003/0208694 A1 * | 11/2003 | Fang | .......................... | 713/201 |

OTHER PUBLICATIONS

Third Office Action from Chinese Patent Application No. 03164824. X, 9 pgs.

* cited by examiner

*Primary Examiner*—Nasser G Moazzami
*Assistant Examiner*—Shanto M Abedin
(74) *Attorney, Agent, or Firm*—Schwabe, Williamson & Wyatt, P.C.

(57) ABSTRACT

It is convenient to allow access to a private network, such as a corporate intranet, or outward facing extranet application, from an external network, such as the Internet. Unfortunately, if an internal authentication system is used to control access from the external network, it may be attacked, such as by a malicious party intentionally attempting multiple invalid authentications to ultimately result in an attacked account being locked out. To circumvent this, an authentication front-end, proxy, wrapper, etc. may be employed which checks for lockout conditions prior to attempting to authenticate security credentials with the internal authentication system.

13 Claims, 4 Drawing Sheets

NETWORK PROTECTING AUTHENTICATION PROXY

FIELD OF THE INVENTION

The invention generally relates to authenticating with a resource, e.g., user login for resource access, and more particularly to providing a front-end to process certain authentication requests, such as ones from an extranet, to allow the front-end to facilitate avoiding authentication lockouts.

BACKGROUND

Corporations and other entities often have bifurcated networks comprised of an "intranet" and an "extranet." An intranet is generally accessible only by the corporation's employees, associates, and machines having authorization to access the intranet. An extranet is generally considered to be a network portion that is not directly part of the intranet, but that is communicatively coupled with the intranet and an external network, such as the Internet, through a firewall or other security barrier. An outsider, e.g. an entity of the external network, seeking access to an externally facing application or intranet resources may contact an extranet server which would prompt the outsider for security credentials, e.g., a username and password for an authorized account, that would be evaluated to determine the outsider's authorization to access the intranet.

Often, the extranet authentication infrastructure maintains user accounts duplicating valid accounts on the intranet to enable intranet users to use outward facing applications by validating against a duplicate set of security credentials. But, while this may enable use of the extranet application by intranet users, significant password synchronization problems may result. In addition, there may be difficulty in propagating new accounts between intranet and extranet servers. One common solution to these problems is to have the extranet application server pass security credentials which are directly validated against an authentication server for the intranet, e.g., the intranet's login server. This configuration removes the risk that the intranet and extranet servers may be out of sync, and other problems.

Unfortunately, by effectively allowing access to the intranet's authentication server from the extranet, the intranet becomes susceptible to attack, such as a denial of service attack. For example, most authentication servers only allow a certain number of improper authentication attempts, such as three attempts, before an account is blocked. Thus, if the extranet is allowed direct access to the intranet authentication server, an external malicious party can block network access for an employee, such as a high level executive, simply by intentionally performing incorrect extranet-based authentication requests. Lockouts may also occur in the process of performing a brut-force password-cracking attempt.

BRIEF DESCRIPTION OF THE DRAWINGS

The features and advantages of the present invention will become apparent from the following detailed description of the present invention in which.

DETAILED DESCRIPTION

Figure 1:
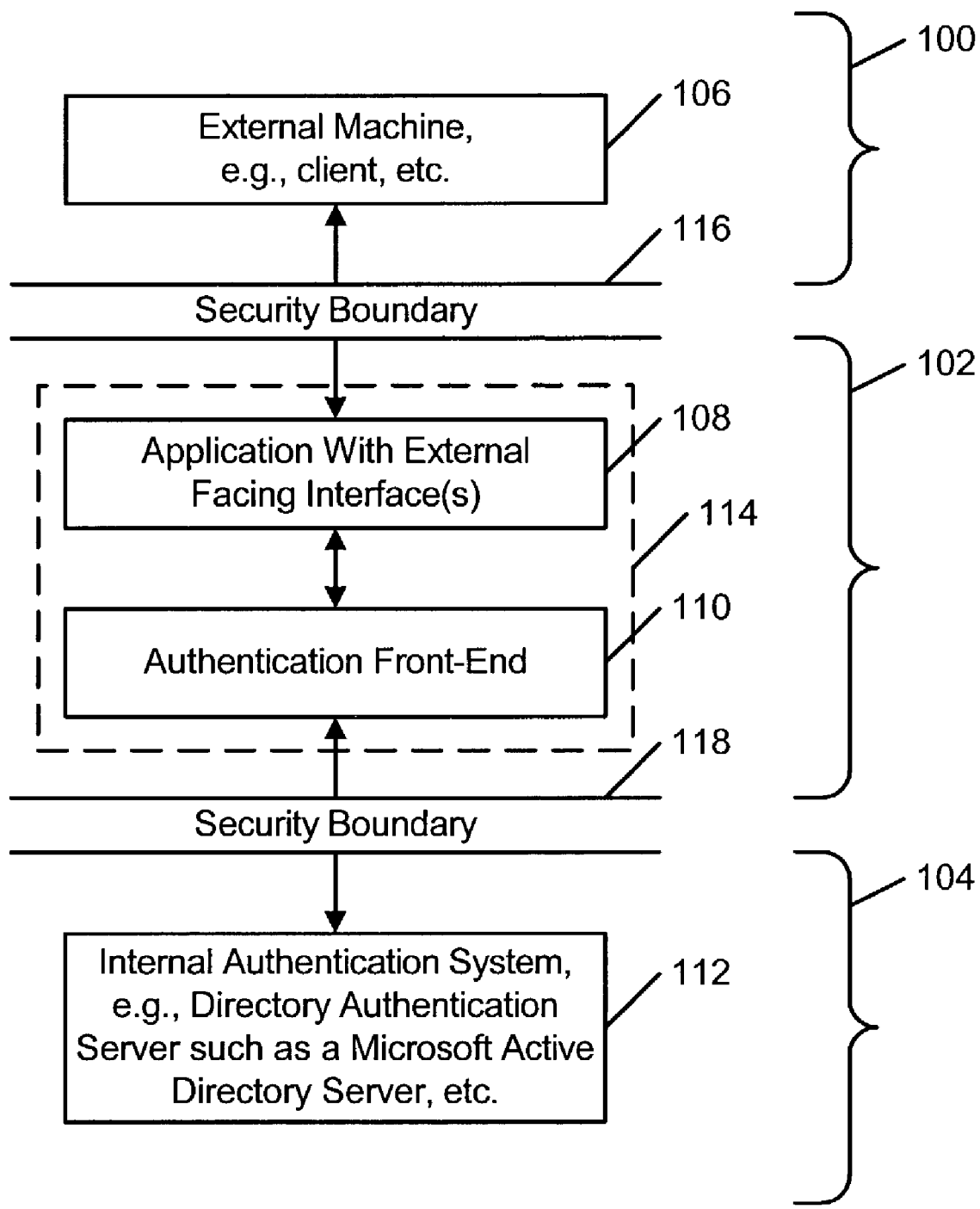
FIG. 1 illustrates an exemplary system according to one embodiment.

FIG. 1 illustrates an exemplary system according to one embodiment for authenticating an outsider with an intranet (internal) authentication system, without invalid authentications resulting in being locked out from the intranet. Illustrated are three regions 100, 102, 104 corresponding to a public network 100, such as the Internet, an extranet 102, and an intranet 104.

An external machine 106 on the external network, such as a client computer, handheld device, etc., may seek access to intranet 104 resources, such as resources of an intranet server (not illustrated), through the extranet 102. The external machine is communicatively coupled with an application 108 that has an external facing interface reachable over the public network. For example, the application may be an "ebusiness" application, business-to-business (B2B) application, accounting program, application for traveling employees, a web server, or other application to which authorized intranet users may require access externally. It will be appreciated that the application may reside on a machine on the intranet, extranet, or external network, with appropriate communication links (or tunnels) provided to allow resource access.

As will be discussed further below, the application 108 is configured to authenticate the external machine 106 (or user thereof), before allowing the external machine access to intranet 104 resources. Towards this end, the application 108 is communicatively coupled with an authentication front-end 110 which operates to receive authentication information, e.g., security credentials, from the application 108 and present the security credentials to an internal authentication system 112 of the intranet, such as a login server or other account authenticator. In one embodiment, the authentication front-end is a proxy for the internal authentication system.

However, rather than simply forwarding the security credentials to the internal authentication system 112, instead the authentication front-end 110 first queries the authentication system to determine login rules and/or a current status for the security credentials to make sure a login attempt does not risk locking out the security credentials due to excessive invalid authentication attempts. For example, if the external machine 106 attempts to access the intranet 104 with a user identifier "Joe" and a password "Secret" as security credentials, the external machine provides these credentials to the application 108, which provides them to the authentication front-end. The authentication front-end then queries the authentication system 112 for information relating to the credentials to determine whether a lockout condition may occur.

Assume a security policy allows three incorrect logins before locking out an account. The authentication front-end may determine, for example, that two previous incorrect attempts have occurred, and thus a third invalid attempt would result in locking out the account. The authentication front-end may then decide to generate a login error to the external machine, as if the security credentials had been provided to the authentication system, but without having actually risked their presentation. Thus, if the "Joe" account is under attack from the external network 100, Joe will nonetheless still be able to log in from the intranet, while leaving extranet access denied. It will be appreciated that various policies or decision systems can be employed to determine if and when to resume extranet access to a particular account. For example, a time out period may be employed, an administrator may be required to review the lockout and approve extranet reinstatement, the account owner may be sent a message requesting the account owner to validate the extranet access attempts when back on the intranet (e.g., the account owner may be requested to acknowledge that the account owner was the source of the extranet authentication failures before extranet access is allowed), etc.

It will be appreciated that various technologies may be employed to allow the authentication front-end 110 to access information relating to the credentials to determine whether a lockout condition may occur. For example, in one embodiment, the internal authentication system 112 is based on a Microsoft Active Directory Server (or equivalent), and the authentication front-end operates as a proxy for the directory server and is thus able to query the directory server for account status information. In one embodiment, the authentication front-end 110 utilizes the Lightweight Directory Access Protocol (LDAP) (see Internet Engineering Task Force (IETF) Request for Comments (RFC) 2251-2254) to query the directory server for lockout conditions for the security credentials. In another embodiment, the authentication front-end utilizes the International Organization for Standardization (ISO)/International Telecommunication Union (ITU) X.500 standard to query the directory server. Note that even though the application 108 and front-end 110 are shown separately, it will be appreciated they may be embodied within a single machine 114 or implemented as a single application program (the dashed lines represent potential combination).

In the illustrated embodiment, security boundary 116 defines a boundary between the external network 100 and the extranet 102, and may be implemented with a firewall or other gateway to limit communication between the external machine 106 and the application 108. Similarly, in the illustrated embodiment, there is a security boundary 118 defining a boundary between the extranet and the intranet 104. It will be appreciated that the authentication front-end 110 may operate in conjunction with various authentication protocols, including Radius, Kerberos, and other authentication infrastructures.

Figure 2:
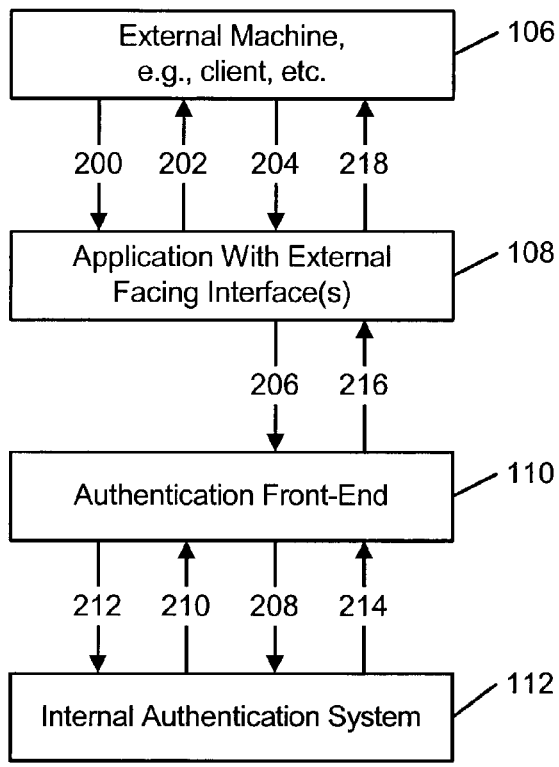
FIG. 2 illustrates a data flow diagram according to one embodiment.

FIG. 2 illustrates a data flow diagram according to one embodiment for the FIG. 1 system. An external machine 106 seeks to access resources on an intranet or authenticate to an extranet application, e.g., FIG. 1 region 104. Towards this end, the external machine sends data 200 to initiate a communication session with an application 108 having an externally facing interface or interfaces. The application 108 responds by sending an authentication request 202 requesting the external machine to identify itself, e.g., to proffer security credentials. In response, the external machine provides security credentials 204.

After the application 108 provides the security credentials 204, the application forwards the credentials 206 to an authentication front-end 110. Note that the credentials 204, 206, while having different reference numerals, may be the same credentials, e.g., the forwarded credentials 206 may be identical to the received credentials 204; alternatively, the application may alter or change the credentials before forwarding them on, such as to convert or transcode between different authentication systems. Thus, in one embodiment, the application operates to convert or transcode between authentication systems to allow a new incompatible protocol, or an older disused protocol, to be used.

As discussed above for FIG. 1, In contrast with conventional authorization schemes where the internal authenticator 112 would be requested to validate the security credentials, and thus risk a lockout from malicious external network activity, instead the authentication front-end 110 queries 208 the internal authenticator to determine if the account for the security credentials 206 risks an invalid authentication threshold. That is, the authentication front-end may query the internal authenticator to determine how many invalid authentication requests remain before the account would be locked out. If the threshold is near, the authentication front-end may elect to deny external network access to preserve intranet access to the account.

The authenticator sends a response 210 indicating the current state of the account. For example, assuming lockouts are based on the number of invalid attempts, the response could indicate the account is allowed three invalid login attempts, and that two invalid login attempts have been recorded. If the account is not at threshold risk, then the authentication front-end 110 may present security credentials 212 to the internal authenticator 112. As discussed above, it will be appreciated that the provided security credentials 212 may be received security credentials 204, or modified security credentials. The internal authenticator sends a response 214, which may a grant of access, or a denial of access. This grant or denial will be cascaded 216, 218 with appropriate security credential modifications or conversions, if necessary, back to the external machine.

Figure 3:
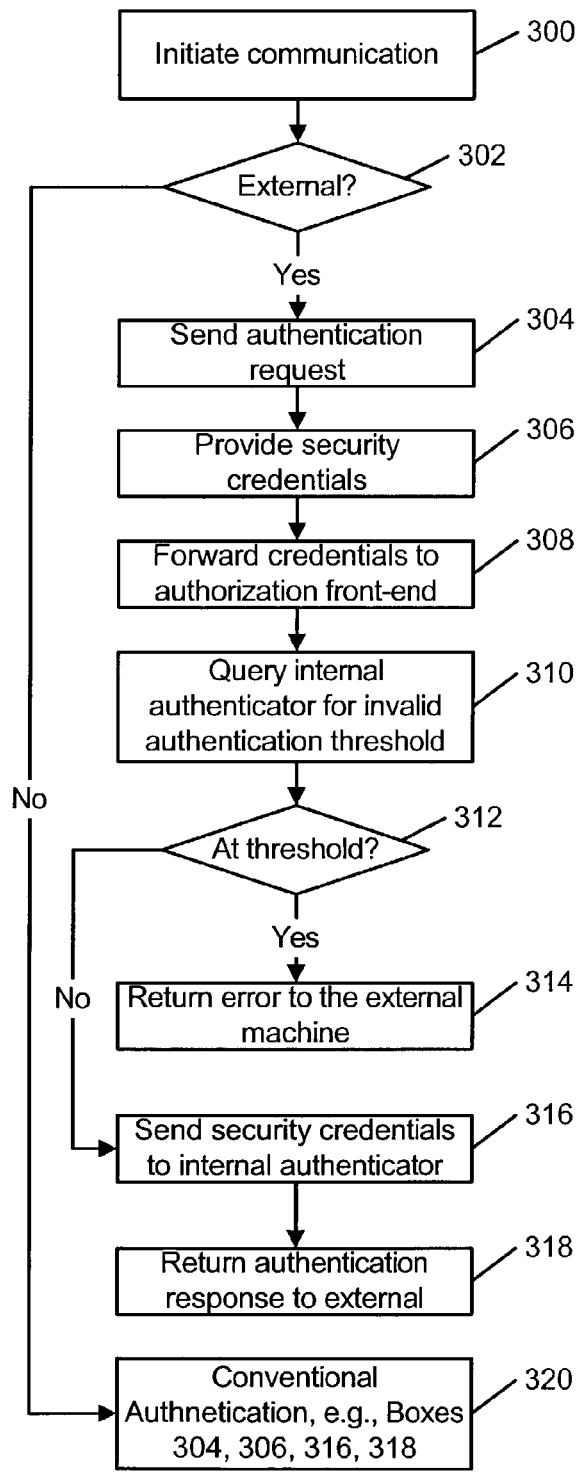
FIG. 3 is a flowchart according to one embodiment.

FIG. 3 is a flowchart according to one embodiment.

An external machine 106 seeks to access resources on an intranet, and initiates 300 a communication session with an application having an externally facing interface. In one embodiment, the application may receive contact from both an intranet and an external network, and thus a test is performed to determine if 302 the contact is from an external network. If external, the application responds 304 with an authentication request for the external machine to identify itself, e.g., to proffer security credentials. In response, the external machine provides 306 security credentials.

It will be appreciated that a variety of application programs and/or hardware may be engaged in the exchange of security credentials. For example, the external machine may be a computing device operating an Internet-type browser, and the application may be a public portion of an Internet web server. The browser may contact the web server, receive an instruction to display a username/password dialog box, in response to which a user of the external machine fills in requested credentials and submits the credentials back to the web server. Or, the external machine's operating system may be attempting to establish an encrypted or secure tunnel, and the application may be a publicly accessible virtual private network (VPN) server. Or, well-known authentication systems for use over conventional physically insecure networks may be modified to implement disclosed embodiments. (See FIG. 4.)

The provided 306 security credentials are then forwarded 308 to an authentication front-end 110 which attempts to query 310 an internal authenticator to determine whether attempting to validate the provided 306 security credentials risks locking out the account identified in the security credentials. If 312 the account is at risk of being locked out, then the authentication front-end returns 314 an authentication error to the external machine without having actually formally attempted to validate the security credentials with the internal authenticator. If 312 the account is not at risk, then the provided 306 security credentials are sent 314 to the internal authenticator for authentication. The internal authenticator responds 318 indicating authentication success or failure. However, it is known even if authentication fails due to a malicious attack from the external network, the account remains accessible from the intranet.

If 302 the communication initiation was not from an external source, then conventional authentication 320 may be performed, e.g., the operations of boxes 304, 306, 316, and 318 without using an authentication front-end to pre-validate login.

Figure 4:
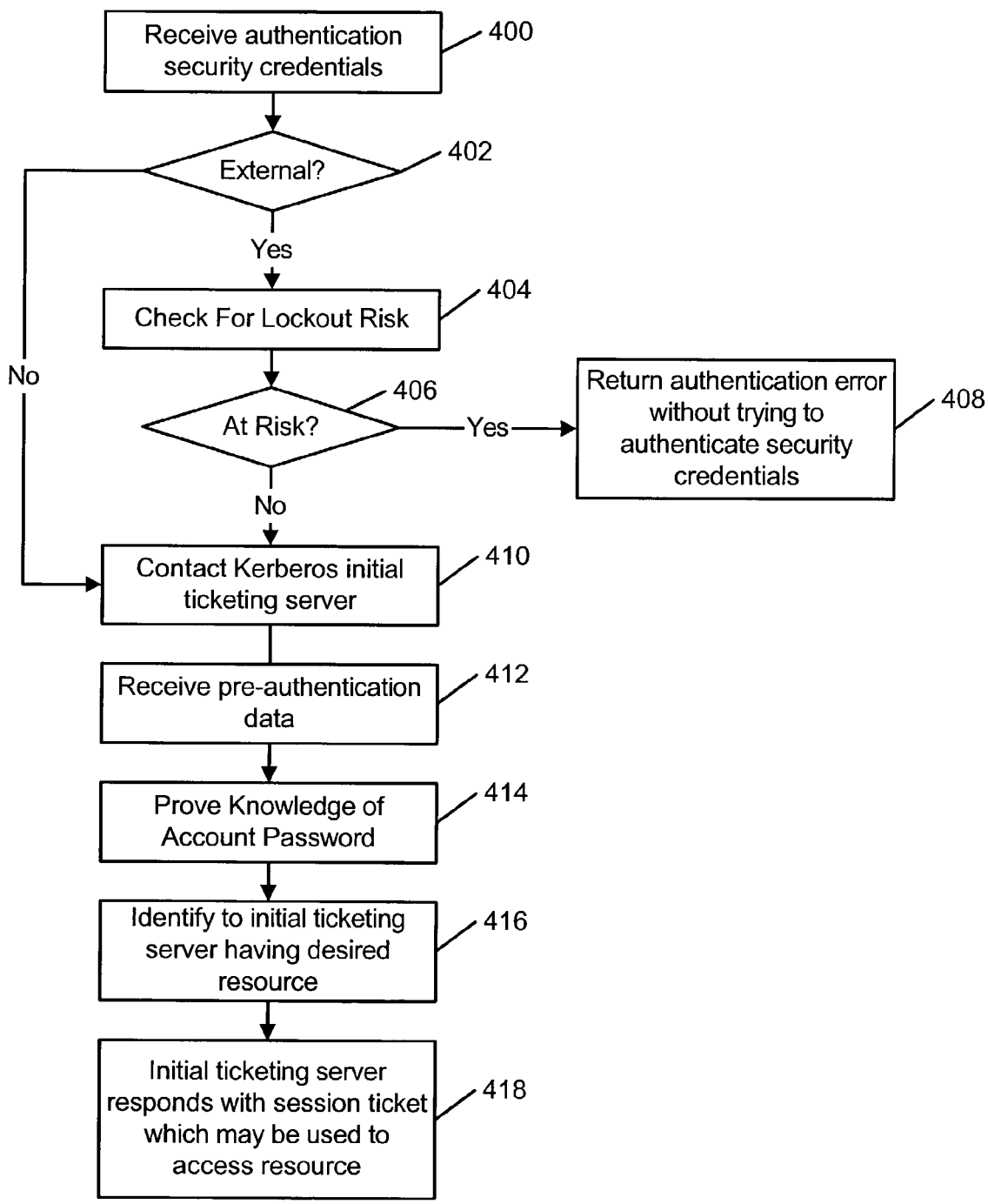
FIG. 4 illustrates a flowchart according to one embodiment for modifying Kerberos authentication.

FIG. 4 illustrates a flowchart according to one embodiment for modifying Kerberos authentication. Kerberos, as described in RFC 1510, is a well-known authentication system that facilitates identity verification, prevents eavesdropping and replay attacks, and provides data stream integrity and secrecy.

Kerberos operates by providing principals (users or services, e.g., of external machine 106) with "tickets" used to identify themselves, and cryptographic keys for securing communication. In one embodiment, Kerberos is modified to recognize zones from which authentication is being attempted, e.g., to recognize authentication over an intranet, e.g., FIG. 1 region 104, versus contact from an external network, e.g., FIG. 1 region 100. It is assumed Kerberos authentication occurs on a first machine separate from a second machine having a desired resource; the second machine may be different from a third machine receiving login credentials. The second and third machines may be the same machine.

Security credentials are received 400, for example, incident to entering a user name and password to login to external machine 106. A test is performed to determine if 402 the contact is from an external source, e.g., the external network. If authorization is attempted from an extranet, a check 404 is performed to determine whether attempting to authenticate the security credentials may result in an account lockout. As discussed above, in one embodiment, a Microsoft Active Directory Server or other device tracking account status data such as login policies, the number of invalid login attempts, etc. may be queried. If pre-authentication is being used, this check 404 is made before Kerberos attempts to pre-authenticate the login, as pre-authentication failure can incur a lockout. In one embodiment, the Kerberos server may incorporate Microsoft Active Directory Server services and be able to directly determine risk of lockout, e.g., the Active Directory Service is acting as the store that contains state data about lockout conditions.

If 406 there is a lockout risk, then an authentication error is returned 408 without actually attempting the Kerberos authentication process. If lockout is not a risk, then authentication may occur normally. That is, the external machine contacts 410 an initial ticketing server such as a Kerberos Initial Ticketing Service (KITS), or, in a Windows environment such as Windows 2000, contacts the nearest Active Directory Key distribution center (KDC). To prevent password guessing, the KITS/KDC may send the external machine pre-authentication data, such as a random sequence that has been encrypted with a secret key associated with the login credentials. When received 412, the external machine must decrypt the pre-authentication data to prove 414 it knows the correct password. After supplying this proof, the external machine identifies 416 to a Ticket Granting Server a server it wishes to contact, e.g., a server having a desired resource, such as a file, directory, etc. The Ticket Granting Server responds 418 with a session ticket including a unique session key that is dual-encrypted with respect to the login credentials and with a secret key for the server to be contacted.

In one embodiment, rather than modifying an authentication system, e.g. Kerberos or another system, instead the invention operates as a wrapper about the system. That is, the invention may be configured to listen on a communication channel typically used by the authentication system, e.g., Transmission Control Protocol (TCP)/Internet Protocol (IP) port 88 for Kerberos, receive an initial contact from the external machine, perform the preliminary check against a lockout condition, and if no lockout is threatened, then tunnel further authentication communication between the external machine and the authentication system.

If 402 the authentication security credentials were not received from the external network, then authentication proceeds conventionally as discussed above, e.g., as if an account were not at risk for a lockout. It will be appreciated by one skilled in the art that the above Kerberos description leaves out many operational details of Kerberos authentication to facilitate readability. It should further be appreciated that the disclosed principles are applicable to most if not all other authentication systems.

Figure 5:
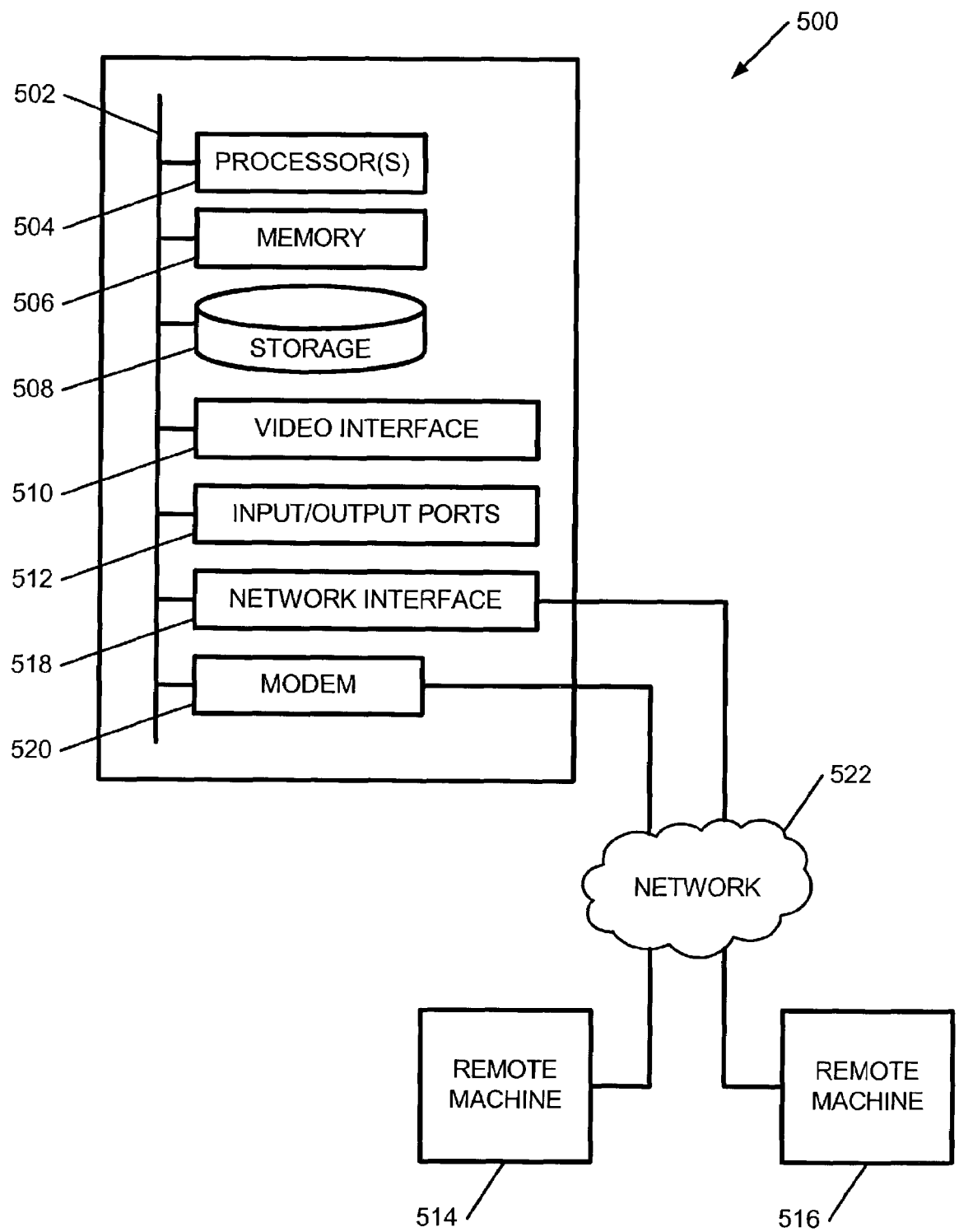
FIG. 5 illustrates a suitable computing environment in which certain aspects of the invention may be implemented.

FIG. 5 and the following discussion are intended to provide a brief, general description of a suitable machine in which certain aspects of the illustrated invention may be implemented. As used herein, the term "machine" includes a single machine, such as a computer, handheld device, transportation device, etc., or a system of communicatively coupled machines or devices.

Typically, a machine 500 includes a system bus 502 to which is attached processors 504, a memory 506, e.g., some state preserving medium, storage devices 508, a video interface 510, and input/output interface ports 512. The machine may be controlled, at least in part, by input from conventional input devices, such as keyboards, mice, etc., as well as by directives received from another machine, interaction with a virtual reality (VR) environment, biometric feedback, or other input source or signal.

The machine may include or be embodied in embedded controllers, such as programmable or non-programmable logic devices or arrays, Application Specific Integrated Circuits, embedded computers, smart cards, and the like. The machine may utilize connections to one or more remote machines 514, 516, such as through a network interface 518, modem 520, or other communicative coupling. Machines may be interconnected by way of a physical and/or logical network 522, such as the FIG. 1 intranet 104, external network 100, the Internet, local area networks, and wide area networks. One skilled in the art will appreciated that network 522 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, volatile and/or non-volatile memory 506, or in storage devices 508 and their associated storage media, including hard-drives, floppy-disks, optical storage, tapes, flash memory, memory sticks, digital video disks, biological storage, etc. Associated data may be delivered over transmission environments, including network 522, in the form of packets, serial data, parallel data, propagated signals, etc., and may be used in a compressed or encrypted format. Associated data may be used in a distributed environment, and stored locally and/or remotely for access by single or multi-processor machines, portable computers, handheld devices, e.g., Personal Digital Assistants (PDAs), cellular telephones, tablets, etc.

Thus, for example, with respect to the illustrated embodiments, assuming machine 500 includes the application 108 of FIG. 1, remote machines 514, 516 may respectively include the authentication front-end 110 and the internal authentication system 112. It will be appreciated that remote machines 514, 516 may be configured like machine 500 and include many or all of the elements discussed for the machine.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for an intermediary device to control intranet access from an external network, comprising:
   receiving, by the intermediary device, a security credential from a source device;
   determining, by the intermediary device, whether the source device is on the external network; and
   if the source device is on the external network,
      querying, by the intermediary device, an authenticator server for an authentication limit, wherein the authentication limit specifies a maximum number of invalid attempts permitted for attempts to authenticate a security credential;
      checking, by the intermediary device, with the authenticator server, whether one more invalid attempt to authenticate the security credential risks exceeding the authentication limit;
      determining, by the intermediary device, whether to attempt to authenticate the security credential with the authenticator server based at least in part on the result of said checking; and
      determining, by the intermediary device, not to attempt to authenticate and returning an authentication error to the source device, if the checking indicates that the attempting risks exceeding the authentication limit.

2. The method of claim 1, further comprising:
   determining, by the intermediary device, to attempt to authenticate the security credential with the authenticator server, if the checking indicates that the attempting does not risk exceeding the authentication limit.

3. The method of claim 1, wherein the authenticator server provides Active Directory services, and wherein said checking comprises:
   issuing a Lightweight Directory Access Protocol (LDAP) query to the authenticator server for the authentication limit.

4. The method of claim 1, further comprising:
   the intermediary device authenticating the security credential with a login server different from the authenticator server.

5. A method for an intermediary device to wrap an authentication service around an authenticator server, comprising:
   listening, by the intermediary device, on a standard communication port used by the authenticator;
   receiving, by the intermediary device, a security credential from a source device;
   determining, by the intermediary device, whether the source device is on an external network; and
   if the source device is on an external network,
      querying, by the intermediary device, the authenticator server for an authentication limit, the authentication limit specifying a maximum number of invalid attempts permitted for attempts to authenticate a security credential;
      checking, by the intermediary device, whether one more invalid attempt to authenticate the security credential risks exceeding the authentication limit;
      determining, by the intermediary device, whether to attempt to authenticate the security credential with the authenticator based at least in part on the result of said checking;
      if the checking indicates that the attempting does not risk exceeding the authentication limit, then determining, by the intermediary device, to attempt to authenticate the security credential with the authenticator server; and
      forwarding, by the intermediary device, the security credential to the authenticator for authentication.

6. The method of claim 5, further comprising:
   tunneling data between the intermediary device and the authenticator server.

7. The method of claim 5, further comprising:
   configuring the authenticator server to listen on a non-standard communication port; and
   relaying data between the standard communication port and the non-standard communication port.

8. The method of claim 5, further comprising:
   encrypting communication between the intermediary device and the authenticator server.

9. An article of manufacture comprising
   a tangible machine-accessible storage medium; and
   a plurality of programming instructions stored on the storage medium and configured to program an intermediary device to enable the intermediary device to:
      receive a security credential from a source device;
      determine whether the source device is on an external network; and
      if the source device is on an external network,
         query an authenticator server for an authentication limit, the authentication limit specifying a maximum number of invalid attempts permitted for attempts to authenticate a security credential;
         check with the authenticator server whether one more invalid attempt to authenticate the security credential risks exceeding the authentication limit;
         determine whether to attempt to authenticate the security credential with the authenticator server based at least in part on the result of said checking; and
         determine not to attempt to authenticate and to return an authentication error to the source if the checking indicates that the attempting risks exceeding the authentication limit.

10. An article of manufacture comprising
    a tangible machine-accessible storage medium; and
    a plurality of programming instructions stored on the storage medium and configured to program an intermediary device to enable the intermediary device to;
       receive a security credential from a source device;
       determine whether the source device is on an external network; and
       if the source device is on an external network,
          query an authenticator server for an authentication limit, the authentication limit specifying a maximum number of invalid attempts permitted for attempts to authenticate a security credential;
          check with the authenticator server whether one more invalid attempt to authenticate the security credential risks exceeding the authentication limit;
          determine whether to attempt to authenticate the security credential with the authenticator server based at least in part on the result of said checking; and
          determine to attempt to authenticate and to attempt to authenticate the security credential with the authenticator server if the checking indicates that the attempting does not risk exceeding the authentication limit.

11. An article of manufacture, comprising:

a tangible machine-accessible storage medium; and a plurality of programming instructions stored on the storage medium and configured to program an intermediary device to enable the intermediary device to:

listen on a standard communication port used by an authenticator server;

receive a security credential from a source device;

determine whether the source device is on an external network; and if the source device is on the external network,
- query the authenticator server for an authentication limit, the authentication limit specifying a maximum number of invalid attempts permitted for attempts to authenticate a security credential;
- check whether one more invalid attempt to authenticate the security credential risks exceeding the authentication limit;
- determine whether to attempt to authenticate the security credential with the authenticator server based at least in part on the result of said checking; and
- determine not to attempt to authenticate and to return an authentication error to the source if the checking indicates that the attempting risks exceeding the authentication limit.

12. The article of manufacture of claim 11 wherein the programming instructions are further configured to program the intermediary device to enable the intermediary device to:
- determine to attempt to authenticate if the checking indicates that the attempting does not risk exceeding the authentication limit, and
- forward the security credential to the authenticator server for authentication.

13. The article of manufacture of claim 11 wherein programming instructions are further configured to program the intermediary device to enable the intermediary device to tunnel data between the intermediary device and the authenticator server.

* * * * *

UNITED STATES PATENT AND TRADEMARK OFFICE
CERTIFICATE OF CORRECTION

| | | |
|---|---|---|
| PATENT NO. | : 7,669,229 B2 | Page 1 of 1 |
| APPLICATION NO. | : 10/294126 | |
| DATED | : February 23, 2010 | |
| INVENTOR(S) | : Steven L. Grobman | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1747 days.

Signed and Sealed this

Fourth Day of January, 2011

David J. Kappos
*Director of the United States Patent and Trademark Office*